(12) United States Patent
Zhu (10) Patent No.: US 11,436,759 B2
(45) Date of Patent: Sep. 6, 2022

(54) IMAGE DECOMPRESSION METHOD, DEVICE AND DISPLAY TERMINAL

(71) Applicant: TCL China Star Optoelectronics Technology Co., Ltd., Shenzhen (CN)

(72) Inventor: Jiang Zhu, Shenzhen (CN)

(73) Assignee: TCL China Star Optoelectronics Technology Co., Ltd.

( * ) Notice: Subject to any disclaimer, the term of this patent is extended or adjusted under 35 U.S.C. 154(b) by 335 days.

(21) Appl. No.: 16/625,336

(22) PCT Filed: Nov. 13, 2019

(86) PCT No.: PCT/CN2019/117926
§ 371 (c)(1),
(2) Date: Dec. 20, 2019

(87) PCT Pub. No.: WO2021/077489
PCT Pub. Date: Apr. 29, 2021

(65) Prior Publication Data
US 2021/0407138 A1 Dec. 30, 2021

(30) Foreign Application Priority Data
Oct. 22, 2019 (CN) .......................... 201911004402.8

(51) Int. Cl.
*G06T 9/00* (2006.01)
*G06F 5/01* (2006.01)
*G06F 17/16* (2006.01)
*G06T 3/40* (2006.01)

(52) U.S. Cl.
CPC .................. *G06T 9/00* (2013.01); *G06F 5/01* (2013.01); *G06F 17/16* (2013.01); *G06T 3/4084* (2013.01)

(58) Field of Classification Search
CPC . G06T 9/00; G06T 3/4084; G06F 5/01; G06F 17/16; H04N 19/625; H04N 19/124
USPC ......................................................... 382/232
See application file for complete search history.

(56) References Cited

U.S. PATENT DOCUMENTS

| | | | |
|---|---|---|---|
| 5,999,957 | A | 12/1999 | Ohta |
| 6,681,052 | B2 | 1/2004 | Luna et al. |
| 2005/0163214 | A1 | 7/2005 | Yachida |
| 2005/0213835 | A1 | 9/2005 | Guangxi et al. |
| 2006/0294173 | A1* | 12/2006 | Hallapuro ............. G06F 17/147 708/402 |

(Continued)

FOREIGN PATENT DOCUMENTS

| | | |
|---|---|---|
| CN | 1564602 A | 1/2005 |
| CN | 1589017 A | 3/2005 |
| CN | 101047849 A | 10/2007 |

(Continued)

*Primary Examiner* — Ayodeji O Ayotunde
(74) *Attorney, Agent, or Firm* — Luedeka Neely Group, PC (57) ABSTRACT

The present disclosure discloses an image decompression method, device, and display terminal. The method includes: a step of acquiring image compression data; a step of performing inverse quantization on the image compression data based on a preset inverse quantization factor to obtain inversely quantized data; wherein the inverse quantization factor is in integer form; and a step of performing an inverse discrete cosine transformation (DCT) on the inversely quantized data to obtain image data; wherein the inverse DCT includes bit-shift operations and addition operations.

12 Claims, 4 Drawing Sheets

(56) References Cited

U.S. PATENT DOCUMENTS

2009/0281425 A1* 11/2009 Sasahara ................ H04N 19/17
                                                              600/443
2012/0057784 A1   3/2012  Horiuchi et al.

FOREIGN PATENT DOCUMENTS

| CN | 102387362 A | 3/2012 |
| CN | 102413331 A | 4/2012 |
| JP | 2914226 B2  | 6/1999 |

* cited by examiner

IMAGE DECOMPRESSION METHOD, DEVICE AND DISPLAY TERMINAL

FIELD OF INVENTION

The present disclosure relates to the technical field of display panels, and specifically to an image decompression, device, and display terminal.

BACKGROUND OF INVENTION

With the improvement of economic level, flat-panel televisions become more and more popular, and resolution of televisions becomes higher and higher, which is developed from initial high-definition to full high-definition and then up to 4K and 8K. Data are transmitted more and more during a time unit. Further, people have higher and higher requirements for quality of liquid crystal display televisions. Due to manufacturing processes of the liquid crystal display televisions, it is inevitable that liquid crystal display panels will have a problem of uneven display image quality, which is often compensated by using image quality uniformity compensation algorithms. As the resolution of liquid crystal display panels increases, storage units required for compensation data become larger and more expensive.

For increasing data transmission and storage, a general approach is data compression. Before data are stored or transmitted, it is usually compressed by the CPU. This process usually takes a long time. Before the data are used, it needs to be decompressed. For example, data transmitted from the Internet and played by the video application (APP) or data transmitted from optical discs and played by digital versatile disc (DVD) need to be decompressed. This process usually requires real-time processing. Field programmable gate array (FPGA) has great advantages in processing data in real time, but data types and complexity of operations have a great impact on the use of FPGA resources.

An discrete cosine transformation (DCT) is a commonly used transformation in compression technology. However, DCT not only uses a large number of floating point operations, but also requires more multipliers, and uses more resources. In addition, an inverse DCT in the prior art also needs a large number of floating point operations and multiplication operations, which results in low efficiency of decompression which is processed in the FPGA.

SUMMARY OF INVENTION

An embodiment of the present disclosure provides an image decompression method, device, and display terminal, so as to solve a problem of low efficiency during image decompression.

An embodiment of the present disclosure provides an image decompression method, includes:
a step of acquiring image compression data;
a step of performing inverse quantization on the image compression data based on a preset inverse quantization factor to obtain inversely quantized data; wherein the inverse quantization factor is in integer form; and
a step of performing an inverse discrete cosine transformation (DCT) on the inversely quantized data to obtain image data; wherein the inverse DCT includes bit-shift operations and addition operations.

Further, the image decompression method also includes prior to the step of performing the inverse quantization on the image compression data based on the preset inverse quantization factor to obtain the inversely quantized data:

a step of acquiring a DCT basis and a quantization factor which are both used during image compression;
a step of acquiring a decimal part of the DCT basis;
a step of performing a left-shift operation on the decimal part by a preset number of bits, to obtain an integer; and
a step of rounding a value obtained by multiplying the obtained integer and the quantization factor, to obtain the inverse quantization factor.

Further, the inversely quantized data are in a form of a matrix of n rows by n columns, wherein n is greater than 1; and the step of performing the inverse DCT on the inversely quantized data to obtain the image data includes:

a step of performing a transformation operation on data in each row of the inversely quantized data to obtain a row-transformation matrix; wherein the transformation operation includes bit-shift operations and addition operations;

a step of performing the transformation operation on data in each column of the row-transformation matrix to obtain a column-transformation matrix; and a step of performing a right-shift operation on the column-transformation matrix by the preset number of bits, to obtain image data.

Further, the step of performing the transformation operation on data in each row of the inversely quantized data to obtain the row-transformation matrix includes:

a step of serving data in each row of the inversely quantized data as a target matrix, forming odd-position data of the target matrix as an odd-position matrix, and forming even-position data of the target matrix as an even-position matrix;

a step of performing a first operation on the odd-position matrix to obtain a first operation matrix; wherein the first operation includes bit-shift operations and addition operations;

a step of performing a second operation on the even-position matrix to obtain a second operation matrix; wherein the second operation includes bit-shift operations and addition operations;

a step of calculating a sum of the first operation matrix and the second operation matrix to obtain a first transformation matrix;

a step of calculating a difference between the first operation matrix and the second operation matrix to obtain a second transformation matrix; and a step of merging data of the first transformation matrix with data of the second transformation matrix into a target transformation matrix corresponding to the target matrix; wherein the target transformation matrix corresponding to the data in the n rows of the inversely quantized data constitutes the row-transformation matrix.

Further, the inversely quantized data are in a form of a matrix of 8 rows by 8 columns, and the target matrix is a matrix of 1 row by 8 columns;

wherein the first operation is operated as follows:

$$Y\_1C = \begin{bmatrix} 1 & 2 & 1 & 1 \\ 1 & 1 & -1 & -2 \\ 1 & -1 & -1 & 2 \\ 1 & -2 & 1 & 1 \end{bmatrix} * \begin{bmatrix} da1 \\ da3 \\ da5 \\ da7 \end{bmatrix};$$

wherein Y_1C is the first operation matrix, $$\begin{bmatrix} da1 \\ da3 \\ da5 \\ da7 \end{bmatrix}$$

is the odd-position matrix, and da1, da3, da5, and da7 are the odd-position data of the target matrix; and wherein the second operation is operated as follows:

$$Y\_2C = \begin{bmatrix} 1 & 1 & 1 & 0 \\ 1 & 0 & -1 & -1 \\ 1 & -1 & 0 & 1 \\ 0 & -1 & 1 & -1 \end{bmatrix} * \begin{bmatrix} 4 & 0 & 0 & 1 \\ 0 & 4 & -1 & 0 \\ 0 & 1 & 4 & 0 \\ -1 & 0 & 0 & 4 \end{bmatrix} * \begin{bmatrix} da2 \\ da4 \\ da6 \\ da8 \end{bmatrix} +$$

$$\begin{bmatrix} 1 & 1 & 1 & 0 \\ 1 & 0 & -1 & -1 \\ 1 & -1 & 0 & 1 \\ 0 & -1 & 1 & -1 \end{bmatrix} * \begin{bmatrix} 1 & 0 & 0 & 0 \\ 0 & 1 & 0 & 0 \\ 0 & 0 & 1 & 0 \\ 0 & 0 & 0 & 1 \end{bmatrix} * \begin{bmatrix} da2 \\ da4 \\ da6 \\ da8 \end{bmatrix};$$

wherein Y_2C is the second operation matrix, $$\begin{bmatrix} da2 \\ da4 \\ da6 \\ da8 \end{bmatrix}$$

is the even-position matrix, and da2, da4, da6, and da8 are even-position data of the target matrix.

An embodiment of the present disclosure also provides an image decompression device, includes:

a data acquiring module configured to acquire image compression data;

an inverse quantization module configured to perform inverse quantization on the image compression data based on a preset inverse quantization factor to obtain inversely quantized data; wherein the inverse quantization factor is in integer form; and an inverse transformation module configured to perform an inverse discrete cosine transformation (DCT) on the inversely quantized data to obtain image data; wherein the inverse DCT includes bit-shift operations and addition operations.

Further, the device also includes:

a factor acquiring module configured to acquire a DCT basis and a quantization factor which are both used during image compression;

a decimal acquiring module configured to acquire a decimal part of the DCT basis;

a left-shift module configured to perform a left-shift operation on the decimal part by a preset number of bits, to obtain an integer; and a rounding module configured to round a value obtained by multiplying the obtained integer and the quantization factor, to obtain the inverse quantization factor.

Further, the inversely quantized data are in a form of a matrix of n rows by n columns, wherein n is greater than 1; wherein the inverse transformation module includes:

a row-transformation unit configured to perform a transformation operation on data in each row of the inversely quantized data to obtain a row-transformation matrix; wherein the transformation operation includes bit-shift operations and addition operations;

a column-transformation unit configured to perform the transformation operation on data in each column of the row-transformation matrix to obtain a column-transformation matrix; and a right-shift unit configured to perform a right-shift operation by the preset number of bits on the column-transformation matrix, to obtain image data.

Further, the row-transformation unit includes:

a matrix acquiring sub-unit configured to serve each row of the inversely quantized data as a target matrix, forming odd-position data of the target matrix as an odd-position matrix, and forming even-position data of the target matrix as an even-position matrix;

a first operation sub-unit configured to perform a first operation on the odd-position matrix to obtain a first operation matrix; wherein the first operation includes bit-shift operations and addition operations;

a second operation sub-unit configured to perform a second operation on the even-position matrix to obtain a second operation matrix; wherein the second operation includes bit-shift operations and addition operations;

a first calculation sub-unit configured to calculate a sum of the first operation matrix and the second operation matrix to obtain a first transformation matrix;

a second calculation sub-unit configured to calculate a difference between the first operation matrix and the second operation matrix to obtain a second transformation matrix; and a merging sub-unit configured to merge data of the first transformation matrix with data of the second transformation matrix into a target transformation matrix corresponding to the target matrix; wherein the target transformation matrix corresponding to the data in the n rows of the inversely quantized data constitutes the row-transformation matrix.

Further, the inversely quantized data are in a form of a matrix of 8 rows by 8 columns, and the target matrix is a matrix of 1 row by 8 columns; and wherein the first operation is operated as follows:

$$Y\_1C = \begin{bmatrix} 1 & 2 & 1 & 1 \\ 1 & 1 & -1 & -2 \\ 1 & -1 & -1 & 2 \\ 1 & -2 & 1 & 1 \end{bmatrix} * \begin{bmatrix} da1 \\ da3 \\ da5 \\ da7 \end{bmatrix};$$

wherein Y_1C is the first operation matrix, $$\begin{bmatrix} da1 \\ da3 \\ da5 \\ da7 \end{bmatrix}$$

is the odd-position matrix, and da1, da3, da5, and da7 are the odd-position data of the target matrix; and wherein the second operation is operated as follows:

$$Y\_2C = \begin{bmatrix} 1 & 1 & 1 & 0 \\ 1 & 0 & -1 & -1 \\ 1 & -1 & 0 & 1 \\ 0 & -1 & 1 & -1 \end{bmatrix} * \begin{bmatrix} 4 & 0 & 0 & 1 \\ 0 & 4 & -1 & 0 \\ 0 & 1 & 4 & 0 \\ -1 & 0 & 0 & 4 \end{bmatrix} * \begin{bmatrix} da2 \\ da4 \\ da6 \\ da8 \end{bmatrix} +$$

$$\begin{bmatrix} 1 & 1 & 1 & 0 \\ 1 & 0 & -1 & -1 \\ 1 & -1 & 0 & 1 \\ 0 & -1 & 1 & -1 \end{bmatrix} * \begin{bmatrix} 1 & 0 & 0 & 0 \\ 0 & 1 & 0 & 0 \\ 0 & 0 & 1 & 0 \\ 0 & 0 & 0 & 1 \end{bmatrix} * \begin{bmatrix} da2 \\ da4 \\ da6 \\ da8 \end{bmatrix};$$

wherein Y_2C is the second operation matrix, $$\begin{bmatrix} da2 \\ da4 \\ da6 \\ da8 \end{bmatrix}$$

is the even-position matrix, and da2, da4, da6, and da8 are even-position data of the target matrix.

An embodiment of the present disclosure also provides a display terminal, which includes a processor and a memory configured to store a plurality of instructions and data, wherein the processor is configured to execute steps including:

a step of acquiring image compression data;

a step of performing inverse quantization on the image compression data based on a preset inverse quantization factor to obtain inversely quantized data; wherein the inverse quantization factor is in integer form; and a step of performing an inverse discrete cosine transformation (DCT) on the inversely quantized data to obtain image data; wherein the inverse DCT includes bit-shift operations and addition operations.

Further, the display terminal also includes prior to the step of performing the inverse quantization on the image compression data based on the preset inverse quantization factor to obtain the inversely quantized data:

a step of acquiring a DCT basis and a quantization factor which are both used during image compression;

a step of acquiring a decimal part of the DCT basis;

a step of performing a left-shift operation on the decimal part by a preset number of bits, to obtain an integer; and a step of rounding a value obtained by multiplying the obtained integer and the quantization factor, to obtain the inverse quantization factor.

Further, the inversely quantized data are in a form of a matrix of n rows by n columns, wherein n is greater than 1; and the step of performing the inverse DCT on the inversely quantized data to obtain the image data includes:

a step of performing a transformation operation on data in each row of the inversely quantized data to obtain a row-transformation matrix; wherein the transformation operation includes bit-shift operations and addition operations;

a step of performing the transformation operation on data in each column of the row-transformation matrix to obtain a column-transformation matrix; and a step of performing a right-shift operation on the column-transformation matrix by the preset number of bits, to obtain image data.

Further, the step of performing the transformation operation on data in each row of the inversely quantized data to obtain the row-transformation matrix includes:

a step of serving data in each row of the inversely quantized data as a target matrix, forming odd-position data of the target matrix as an odd-position matrix, and forming even-position data of the target matrix as an even-position matrix;

a step of performing a first operation on the odd-position matrix to obtain a first operation matrix; wherein the first operation includes bit-shift operations and addition operations;

a step of performing a second operation on the even-position matrix to obtain a second operation matrix; wherein the second operation includes bit-shift operations and addition operations;

a step of calculating a sum of the first operation matrix and the second operation matrix to obtain a first transformation matrix;

a step of calculating a difference between the first operation matrix and the second operation matrix to obtain a second transformation matrix; and a step of merging data of the first transformation matrix with data of the second transformation matrix into a target transformation matrix corresponding to the target matrix; wherein the target transformation matrix corresponding to the data in the n rows of the inversely quantized data constitutes the row-transformation matrix.

Further, the inversely quantized data are in a form of a matrix of 8 rows by 8 columns, and the target matrix is a matrix of 1 row by 8 columns;

wherein the first operation is operated as follows:

$$Y\_1C = \begin{bmatrix} 1 & 2 & 1 & 1 \\ 1 & 1 & -1 & -2 \\ 1 & -1 & -1 & 2 \\ 1 & -2 & 1 & 1 \end{bmatrix} * \begin{bmatrix} da1 \\ da3 \\ da5 \\ da7 \end{bmatrix};$$

wherein Y_1C is the first operation matrix, $$\begin{bmatrix} da1 \\ da3 \\ da5 \\ da7 \end{bmatrix}$$

is the odd-position matrix, and da1, da3, da5, and da7 are the odd-position data of the target matrix; and wherein the second operation is operated as follows:

$$Y\_2C = \begin{bmatrix} 1 & 1 & 1 & 0 \\ 1 & 0 & -1 & -1 \\ 1 & -1 & 0 & 1 \\ 0 & -1 & 1 & -1 \end{bmatrix} * \begin{bmatrix} 4 & 0 & 0 & 1 \\ 0 & 4 & -1 & 0 \\ 0 & 1 & 4 & 0 \\ -1 & 0 & 0 & 4 \end{bmatrix} * \begin{bmatrix} da2 \\ da4 \\ da6 \\ da8 \end{bmatrix} +$$

$$\begin{bmatrix} 1 & 1 & 1 & 0 \\ 1 & 0 & -1 & -1 \\ 1 & -1 & 0 & 1 \\ 0 & -1 & 1 & -1 \end{bmatrix} * \begin{bmatrix} 1 & 0 & 0 & 0 \\ 0 & 1 & 0 & 0 \\ 0 & 0 & 1 & 0 \\ 0 & 0 & 0 & 1 \end{bmatrix} * \begin{bmatrix} da2 \\ da4 \\ da6 \\ da8 \end{bmatrix};$$

wherein Y_2C is the second operation matrix, $$\begin{bmatrix} da2 \\ da4 \\ da6 \\ da8 \end{bmatrix}$$

is the even-position matrix, and da2, da4, da6, and da8 are even-position data of the target matrix.

Beneficial effects of the present disclosure are that, inversely quantized data are obtained by the image compression data are inverse quantized based on the inverse quantization factor in integer form. In addition, the inverse DCT is performed on the inversely quantized data based on the shift operations and the addition operations to obtain the image data, so that the image is decompressed without floating point operations and multiplication operations during image decompression, which effectively improves processing efficiency of decompression and ensures processing of decompression in real-time.

BRIEF DESCRIPTION OF DRAWINGS

By detailed description of specific embodiments of the present disclosure in conjunction with the accompanying drawings as follows, it will make that technical solutions and other beneficial effects of the present disclosure are obvious.

DETAILED DESCRIPTION OF PREFERRED EMBODIMENTS

The specific structural and functional details disclosed herein are merely representative and are for a purpose of describing exemplary embodiments of the present disclosure. However, this application may be embodied in many alternative forms and should not be construed as being limited only to the embodiments set forth herein.

It should be understood that, in a description of the present disclosure, a plurality of terms "center", "horizontal", "up", "down", "left", "right", "vertical", "horizontal", "top", "bottom", "inside", and "outside", which are indicated orientation or positional relationship based on the orientation or positional relationship shown in the drawings, and are used only for convenience of describing this application and simplified description. It does not indicate or imply that referred devices or elements must have a specific orientation or construct and operate in a specific orientation. Therefore, it cannot be understood as a limitation to this application. In addition, a plurality of terms "first" and "second" are used for descriptive purposes only and should not be interpreted as indicating or implying a relative importance or implicitly indicating a number of technical features indicated. Therefore, features defined as "first" and "second" may explicitly or implicitly include one or more of the features. In the description of this application, unless otherwise stated, "multiple" means two or more. In addition, a term "include" and any variations thereof are intended to cover a non-exclusive inclusion.

In the description of this application, it should be noted that, a plurality of terms "install", "couple", and "connect" should be understood in a broad sense unless otherwise specified and limited. For example, it can be a supporting connection, a detachable connection, or an integral connection; it can be a mechanical connection or an electrical connection; it can be directly connected; it can be indirectly connected through an intermediate medium; and it can be an internal connection of two components. For those of ordinary skill in the art, the specific meanings of the above terms in this application can be understood in specific situations.

The terminology used herein is for a purpose of describing particular embodiments only and is not intended to limit the exemplary embodiments. Unless a context clearly indicates otherwise, singular forms used herein, such as "a" and "an" are intended to include the plural. It should be understood that, a plurality of terms "include" and/or "comprise" used herein specify a presence of stated features, integers, steps, operations, units and/or components without precluding the presence or addition of one or more other features, integers, steps, operations, units, components, and/or combinations thereof.

The application is further described below with reference to the drawings and embodiments.

Figure 1:
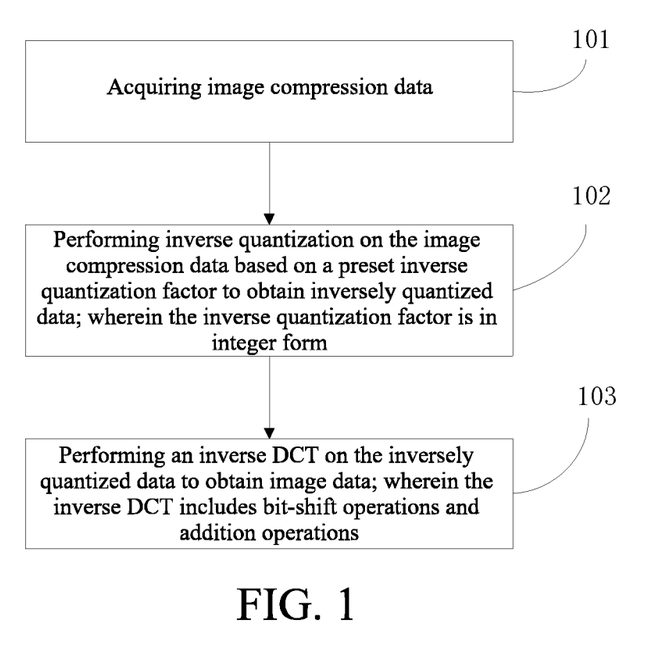
FIG. 1 is a flowchart of an image decompression method provided in an embodiment of the present disclosure.

As shown in FIG. 1, an image decompression method is provided in an embodiment of the present disclosure and includes:

a step 101, which acquires image compression data.

In the present embodiment, the image compression data refer to compressed data obtained by compressing original image data. Compression processes can include an discrete cosine transformation (DCT), quantization, and encoding. DCT is also called as an discrete cosine transformation, and has purpose to transform signals from the spatial domain into the frequency domain. It can effectively remove correlation of the signals, and concentrate most of energy in a low frequency region, and then selectively encode any significant signal in the low frequency domain and discard insignificant signals in the high frequency domain, to achieve a purpose of improving compression efficiency.

The DCT formula in N×M space is as follows:

$$F(u, v) = \frac{2}{N} c(u)c(v) \sum_{n=0}^{N-1} \sum_{m=0}^{M-1} f(n, m) \cos\frac{(2n+1)u\pi}{2N} \cos\frac{(2m+1)v\pi}{2M}$$

$$u = 0, \ldots, N-1, v = 0, \ldots, M-1$$

Two-dimensional DCT is equivalent to performing row transformations firstly and then performing column transformations on image data, that is, an inner product of N elements in each row or each column with N transformation bases in different frequencies, so that the DCT formula can be equivalent to $Y = C*X*C^T$, wherein C is represented to the DCT basis.

The DCT basis C is represented as:

$$C = \frac{1}{\sqrt{N}}$$

$$\begin{bmatrix} 1 & 1 & \ldots & 1 \\ \sqrt{2}\cos\left(\frac{\pi}{2N}\right) & \sqrt{2}\cos\left(\frac{3\pi}{2N}\right) & \ldots & \sqrt{2}\cos\left(\frac{(2N-1)\pi}{2N}\right) \\ \vdots & \vdots & \ddots & \vdots \\ \sqrt{2}\cos\left(\frac{(N-1)\pi}{2N}\right) & \sqrt{2}\cos\left(\frac{3(N-1)\pi}{2N}\right) & \ldots & \sqrt{2}\cos\left(\frac{(2N-1)(N-1)\pi}{2N}\right) \end{bmatrix}$$

Quantization refers to a process that continuous values (or a large number of possible discrete values) are approximated to into a finite number of (or fewer) discrete values. The data after performing DCT are quantized based on a preset quantization factor Q.

Encoding is a process of converting information from one format or form to another. Quantization data are encoded to obtain image compression data.

A step 102, which performs inverse quantization on the image compression data based on a preset inverse quantization factor to obtain inversely quantized data, wherein the inverse quantization factor is in integer form.

In the present embodiment, after the image compression data are obtained, the image compression data can firstly be decoded. Decoding is a process of restoring information from an encoded form to its original state before encoding.

Further, the image compression data which is decoded can be performed inverse quantization based on a preset inverse quantization factor, wherein the inverse quantization factor is pre-calculated and set according to the DCT basis C and the quantization factor Q during image compression.

Specifically, a calculating approach of the inverse quantization factor includes:
a step of acquiring a DCT basis and a quantization factor which are both used during image compression;
a step of acquiring a decimal part of the DCT basis;
a step of performing a left-shift operation on the decimal part by a preset number of bits, to obtain an integer; and
a step of rounding a value obtained by multiplying the obtained integer and the quantization factor, to obtain the inverse quantization factor.

It should be noted that, the DCT basis C and the quantization factor Q are both matrices. The data in each element of the DCT basis C include an integral part and a decimal part. The decimal part of each element of the DCT basis C is extracted to form a decimal matrix A. The decimal matrix A is left-shifted by a preset number of bits f, which is equivalent to magnifying the decimal matrix A by 2 to the power f, to change into an integer. A value combining the integer with the quantization factor Q is rounded to obtain the inverse quantization factor V. The decimal matrix A may be a matrix of 8 rows by 8 columns, the quantization factor may be a matrix of 8 rows by 8 columns, and the preset number of bits f may be a matrix of 8 rows by 8 columns, as follows:

| A11 | A12 | A13 | A14 | A15 | A16 | A17 | A18 |
| A21 | A22 | A23 | A24 | A25 | A26 | A27 | A28 |
| A31 | A32 | A33 | A34 | A35 | A36 | A37 | A38 |
| A41 | A42 | A43 | A44 | A45 | A46 | A47 | A48 |
| A51 | A52 | A53 | A54 | A55 | A56 | A57 | A58 |
| A61 | A62 | A63 | A64 | A65 | A66 | A67 | A68 |
| A71 | A72 | A73 | A74 | A75 | A76 | A77 | A78 |
| A81 | A82 | A83 | A84 | A85 | A86 | A87 | A88 |

| Q11 | Q12 | Q13 | Q14 | Q15 | Q16 | Q17 | Q18 |
| Q21 | Q22 | Q23 | Q24 | Q25 | Q26 | Q27 | Q28 |
| Q31 | Q32 | Q33 | Q34 | Q35 | Q36 | Q37 | Q38 |
| Q41 | Q42 | Q43 | Q44 | Q45 | Q46 | Q47 | Q48 |
| Q51 | Q52 | Q53 | Q54 | Q55 | Q56 | Q57 | Q58 |
| Q61 | Q62 | Q63 | Q64 | Q65 | Q66 | Q67 | Q68 |
| Q71 | Q72 | Q73 | Q74 | Q75 | Q76 | Q77 | Q78 |
| Q81 | Q82 | Q83 | Q84 | Q85 | Q86 | Q87 | Q88 |

| f11 | f12 | f13 | f14 | f15 | f16 | f17 | f18 |
| f21 | f22 | f23 | f24 | f25 | f26 | f27 | f28 |
| f31 | f32 | f33 | f34 | f35 | f36 | f37 | f38 |
| f41 | f42 | f43 | f44 | f45 | f46 | f47 | f48 |
| f51 | f52 | f53 | f54 | f55 | f56 | f57 | f58 |
| f61 | f62 | f63 | f64 | f65 | f66 | f67 | f68 |
| f71 | f72 | f73 | f74 | f75 | f76 | f77 | f78 |
| f81 | f82 | f83 | f84 | f85 | f86 | f87 | f88 |

A formula for calculating the inverse quantization factor V is as follows:

$$V = \text{floor}(A * Q * 2^f)$$

wherein * presents dot multiplication, floor presents rounding.

Since the decimal matrix A and the quantization factor Q are fixed values, a calculation of the inverse quantization factor V can be performed offline. The inverse quantization factor V obtained by the calculation is written into registers, and is directly read from the registers during the inverse quantization.

During the inverse quantization, an inverse quantization factor V in the present embodiment is used instead of the quantization factor Q in the prior art, and the inverse quantization is performed on the decoded image compression data, so that no inverse quantization operation is increased.

A step 103, which performs inverse DCT on the inversely quantized data to obtain image data, wherein the inverse DCT includes bit-shift operations and addition operations.

In the present embodiment, the inversely quantized data are in a form of a matrix of n rows by n columns, wherein n is greater than 1, and each element of the matrix is an integer. The inverse DCT performed on integer matrix can use only shift operations and addition operations, and avoid from that multiplication operations are used. Thus, it effectively reduces complexity of computation and improves processing efficiency of the inverse DCT.

Specifically, the step of performing the inverse DCT on the inversely quantized data to obtain the image data includes:
a step of performing a transformation operation on data in each row of the inversely quantized data to obtain a row-transformation matrix; wherein the transformation operation includes bit-shift operations and addition operations;
a step of performing the transformation operation on data in each column of the row-transformation matrix to obtain a column-transformation matrix; and
a step of performing a right-shift operation on the column-transformation matrix by the preset number of bits, to obtain image data.

It should be noted that, for the inversely quantized data which is a matrix of n rows by n columns, the transformation operation is started from the first row and sequentially transformed to the n-th row. After the n-th row data are completely transformed, a row-transformation matrix can be obtained, and the row-transformation matrix is still a matrix of n rows by n columns. Then, for the row-transformation matrix, the transformation operation is started from the first column and sequentially transformed to the n-th column. After the n-th column data are completely transformed, a column-transformation matrix can be obtained, and the column-transformation matrix is still a matrix of n rows by n columns. The transformation computation on each row is the same as the transformation computation on each column.

Specifically, the step of performing the transformation operation on data in each row of the inversely quantized data to obtain the row-transformation matrix includes: a step of serving data in each row of the inversely quantized data as a target matrix, forming odd-position data of the target matrix as an odd-position matrix, and forming even-position data of the target matrix as an even-position matrix;

a step of performing a first operation on the odd-position matrix to obtain a first operation matrix; wherein the first operation includes bit-shift operations and addition operations;

a step of performing a second operation on the even-position matrix to obtain a second operation matrix; wherein the second operation includes bit-shift operations and addition operations;

a step of calculating a sum of the first operation matrix and the second operation matrix to obtain a first transformation matrix;

a step of calculating a difference between the first operation matrix and the second operation matrix to obtain a second transformation matrix; and a step of merging data of the first transformation matrix with data of the second transformation matrix into a target transformation matrix corresponding to the target matrix; wherein the target transformation matrix corresponding to the data in the n rows of the inversely quantized data constitutes the row-transformation matrix.

Figure 2:
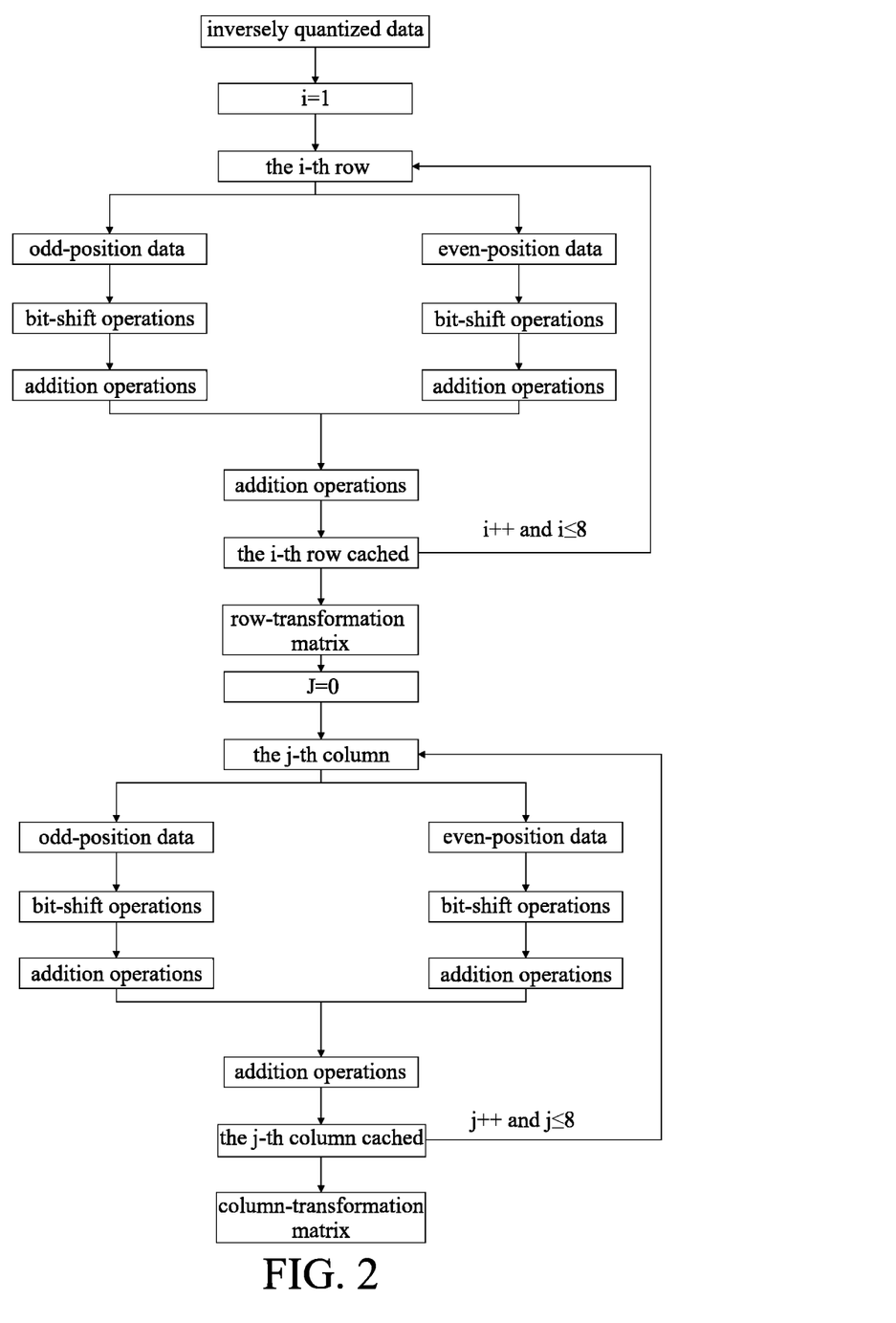
FIG. 2 is a schematic diagram illustrating principle from inversely quantized data into a form of a column-transformation matrix.

In the present embodiment, the transformation operation on data in each row of the inversely quantized data is the same as the transformation computation on data in each column of the row-transformation matrix. As shown in FIG. 2, for the inversely quantized data, a row number i of the inversely quantized data is firstly set, let i=1, and the transformation operation is started from the first row, that is, the data in the i-th row of the inverse-quantization data are obtained and are divided into an odd-position matrix and an even-position matrix. The first operation is performed on the odd-position matrix and the second operation is performed on the even-position matrix. The first operation and the second operation both include bit-shift operations and addition operations. Correspondingly, the first operation matrix and the second operation matrix are obtained. Then, the first operation matrix and the second operation matrix are performed by an addition operation, which includes operations of adding and subtracting the first operation matrix to/from the second operation matrix. The operating results of the two operations are combined. If the results of the addition operation are arranged in sequence, and the result of the subtraction operation is arranged in reverse order after the result of the addition operation, so as to form the transformed i-th row of data. The transformed data in the i-th row are cached, at the same time, i++, if i≤8 at this time, continue to obtain the i-th row of the inversely quantized data and perform the transformation operation on the i-th row of data; if I>8 at this time, all the cached row data are arranged in the original row order to form the row-transformation matrix.

Further, for the row-transformation matrix, a column number j of the row-transformation matrix is set, let j=0, and the transformation operation is started from the first column, that is, the data in the j-th column of the row-transformation matrix is obtained and divided as an odd-position matrix and an even-position matrix. The first operation is performed on the odd-position matrix and the second operation is performed on the even-position matrix. The first operation and the second operation both include bit-shift operations and addition operations. Correspondingly, the first operation matrix and the second operation matrix are obtained. Then, the first operation matrix and the second operation matrix are performed by an addition operation, which includes operations of adding and subtracting the first operation matrix to/from the second operation matrix. The results of the two operations are arranged alternately. If the results of the addition operation are arranged in sequence, and the result of the subtraction operation is arranged in reverse order after the result of the addition operation, so as to form the transformed j-th row of data. The transformed data in the j-th row are cached, at the same time, j++, if j≤8 at this time, continue to obtain the j-th row of the row-transformation matrix and perform the transformation operation on the j-th row of data; if j>8 at this time, all the cached column data are arranged in the original row order to form the column-transformation matrix.

For example, the inverse quantization matrix is a matrix of 8 rows by 8 columns, the data in one of the rows are served as a target matrix. The data in the target matrix are da1, da2, da3, da4, da5, da6, da7, and da8 in sequence, wherein da1, da3, da5, and da7 are the odd-position data which constitute the odd-position matrix $$\begin{bmatrix} da1 \\ da3 \\ da5 \\ da7 \end{bmatrix},$$

and da2, da4, da6, and da8 are the even-position data which constitute the even-position matrix $$\begin{bmatrix} da2 \\ da4 \\ da6 \\ da8 \end{bmatrix}.$$

The first operation is performed on the odd-position matrix to obtain the first operation matrix $Y\_1C$, wherein the first operation is operated as follow:

$$Y\_1C = \begin{bmatrix} 1 & 2 & 1 & 1 \\ 1 & 1 & -1 & -2 \\ 1 & -1 & -1 & 2 \\ 1 & -2 & 1 & 1 \end{bmatrix} * \begin{bmatrix} da1 \\ da3 \\ da5 \\ da7 \end{bmatrix}.$$

The data in the odd-position matrix is multiplied by 2 to left-shift one bit, and the data are multiplied by 1 to represent no shift. Thus, only shift operations and addition operation are used in the first operation. The second operation is performed on the even-position matrix to obtain the second operation matrix $Y\_2C$, wherein the second operation is operated as follow:

$$Y\_2C = \begin{bmatrix} 1 & 1 & 1 & 0 \\ 1 & 0 & -1 & -1 \\ 1 & -1 & 0 & 1 \\ 0 & -1 & 1 & -1 \end{bmatrix} * \begin{bmatrix} 4 & 0 & 0 & 1 \\ 0 & 4 & -1 & 0 \\ 0 & 1 & 4 & 0 \\ -1 & 0 & 0 & 4 \end{bmatrix} * \begin{bmatrix} da2 \\ da4 \\ da6 \\ da8 \end{bmatrix} +$$

$$\begin{bmatrix} 1 & 1 & 1 & 0 \\ 1 & 0 & -1 & -1 \\ 1 & -1 & 0 & 1 \\ 0 & -1 & 1 & -1 \end{bmatrix} * \begin{bmatrix} 1 & 0 & 0 & 0 \\ 0 & 1 & 0 & 0 \\ 0 & 0 & 1 & 0 \\ 0 & 0 & 0 & 1 \end{bmatrix} * \begin{bmatrix} da2 \\ da4 \\ da6 \\ da8 \end{bmatrix}$$

The data in the even-position matrix is multiplied by 4 to left-shift two bits, the data are multiplied by 2 to left-shift one bit, the data are multiplied by 1 to represent no shift. Thus, only shift operations and addition operation are used in the second operation.

Further, a sum of the first operation matrix Y_1C and the second operation matrix Y_2C is calculated, that is, the first transformation matrix I_1C=Y_1 C+Y_2 C, at the same time, a difference between the first operation matrix Y_1C and the second operation matrix Y_2C is calculated, that is, the second transformation matrix I_2C=Y_1C−Y_2C. The data in the first operation matrix Y_1C is arranged in sequence, and the data in the second operation matrix Y_2C is arranged in reverse order after the data in the first operation matrix Y_1C, to constitute a target transformation matrix I_Y (i)=[I_1C(1) I_1C(2) I_1C(3) I_1C(4) I_2C(4) I_2C(3) I_2C(2) I_2C(1)], which is corresponding to the target matrix.

After obtaining the column-transformation matrix, since the decimal part of the DCT basis is left-shifted by the preset number of bits f, the data in the column-transformation matrix needs to be right-shifted by the preset number of bits f That is, the data in the column-transformation matrix is divided by $2^f$ to obtain the original image data.

The present embodiment of the present disclosure can achieve that, the inversely quantized data are obtained by the image compression data are inverse quantized based on the inverse quantization factor in integer form. In addition, the inverse DCT is performed on the inversely quantized data based on the shift operations and the addition operations to obtain the image data, so that the image is decompressed without floating point operations and multiplication operations during image decompression, which effectively improves processing efficiency of decompression and ensures processing of decompression in real-time.

Correspondingly, an embodiment of the present disclosure also provides an image decompression device, which can implement all processes of the image decompression method in the above embodiment.

Figure 3:
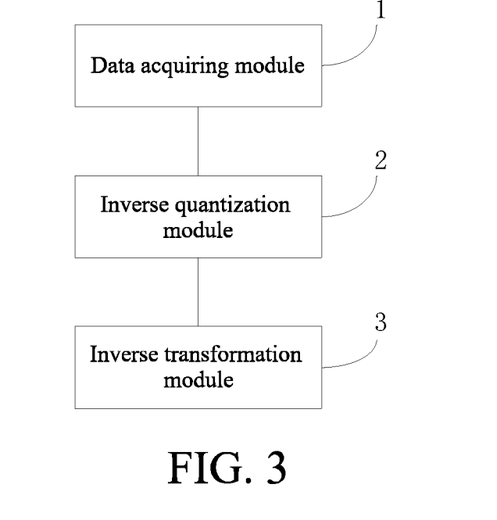
FIG. 3 is a schematic structural diagram of an image decompression device provided in an embodiment of the present disclosure.

As shown in FIG. 3, the image decompression device provided in the embodiment of the present disclosure includes:
a data acquiring module 1 configured to acquire image compression data;
an inverse quantization module 2 configured to perform inverse quantization on the image compression data based on a preset inverse quantization factor to obtain inversely quantized data; wherein the inverse quantization factor is in integer form; and
an inverse transformation module 3 configured to perform an inverse discrete cosine transformation (DCT) on the inversely quantized data to obtain image data; wherein the inverse DCT includes bit-shift operations and addition operations.

Further, the device also includes:
a factor acquiring module configured to acquire a DCT basis and a quantization factor which are both used during image compression;
a decimal acquiring module configured to acquire a decimal part of the DCT basis;
a left-shift module configured to perform a left-shift operation on the decimal part by a preset number of bits, to obtain an integer; and
a rounding module configured to round a value obtained by multiplying the obtained integer and the quantization factor, to obtain the inverse quantization factor.

Further, the inversely quantized data are in a form of a matrix of n rows by n columns, wherein n is greater than 1; wherein the inverse transformation module includes:
a row-transformation unit configured to perform a transformation operation on data in each row of the inversely quantized data to obtain a row-transformation matrix; wherein the transformation operation includes bit-shift operations and addition operations;
a column-transformation unit configured to perform the transformation operation on data in each column of the row-transformation matrix to obtain a column-transformation matrix; and a right-shift unit configured to perform a right-shift operation by the preset number of bits on the column-transformation matrix, to obtain image data.

Further, the row-transformation unit includes:
a matrix acquiring sub-unit configured to serve each row of the inversely quantized data as a target matrix, forming odd-position data of the target matrix as an odd-position matrix, and forming even-position data of the target matrix as an even-position matrix;
a first operation sub-unit configured to perform a first operation on the odd-position matrix to obtain a first operation matrix; wherein the first operation includes bit-shift operations and addition operations;
a second operation sub-unit configured to perform a second operation on the even-position matrix to obtain a second operation matrix; wherein the second operation includes bit-shift operations and addition operations;
a first calculation sub-unit configured to calculate a sum of the first operation matrix and the second operation matrix to obtain a first transformation matrix;
a second calculation sub-unit configured to calculate a difference between the first operation matrix and the second operation matrix to obtain a second transformation matrix; and
a merging sub-unit configured to merge data of the first transformation matrix with data of the second transformation matrix into a target transformation matrix corresponding to the target matrix; wherein the target transformation matrix corresponding to the data in the n rows of the inversely quantized data constitutes the row-transformation matrix.

Further, the inversely quantized data are in a form of a matrix of 8 rows by 8 columns, and the target matrix is a matrix of 1 row by 8 columns; and wherein the first operation is operated as follows:

$$Y\_1C = \begin{bmatrix} 1 & 2 & 1 & 1 \\ 1 & 1 & -1 & -2 \\ 1 & -1 & -1 & 2 \\ 1 & -2 & 1 & 1 \end{bmatrix} * \begin{bmatrix} da1 \\ da3 \\ da5 \\ da7 \end{bmatrix};$$

wherein Y_1C is the first operation matrix, $$\begin{bmatrix} da1 \\ da3 \\ da5 \\ da7 \end{bmatrix}$$

is the odd-position matrix, and da1, da3, da5, and da7 are the odd-position data of the target matrix; and
wherein the second operation is operated as follows:

$$Y\_2C = \begin{bmatrix} 1 & 1 & 1 & 0 \\ 1 & 0 & -1 & -1 \\ 1 & -1 & 0 & 1 \\ 0 & -1 & 1 & -1 \end{bmatrix} * \begin{bmatrix} 4 & 0 & 0 & 1 \\ 0 & 4 & -1 & 0 \\ 0 & 1 & 4 & 0 \\ -1 & 0 & 0 & 4 \end{bmatrix} * \begin{bmatrix} da2 \\ da4 \\ da6 \\ da8 \end{bmatrix} +$$

$$\begin{bmatrix} 1 & 1 & 1 & 0 \\ 1 & 0 & -1 & -1 \\ 1 & -1 & 0 & 1 \\ 0 & -1 & 1 & -1 \end{bmatrix} * \begin{bmatrix} 1 & 0 & 0 & 0 \\ 0 & 1 & 0 & 0 \\ 0 & 0 & 1 & 0 \\ 0 & 0 & 0 & 1 \end{bmatrix} * \begin{bmatrix} da2 \\ da4 \\ da6 \\ da8 \end{bmatrix};$$

wherein Y_2C is the second operation matrix, $$\begin{bmatrix} da2 \\ da4 \\ da6 \\ da8 \end{bmatrix}$$

is the even-position matrix, and da2, da4, da6, and da8 are even-position data of the target matrix.

The present embodiment of the present disclosure can achieve that, the inversely quantized data are obtained by the image compression data are inverse quantized based on the inverse quantization factor in integer form. In addition, the inverse DCT is performed on the inversely quantized data based on the shift operations and the addition operations to obtain the image data, so that the image is decompressed without floating point operations and multiplication operations during image decompression, which effectively improves processing efficiency of decompression and ensures processing of decompression in real-time.

Figure 4:
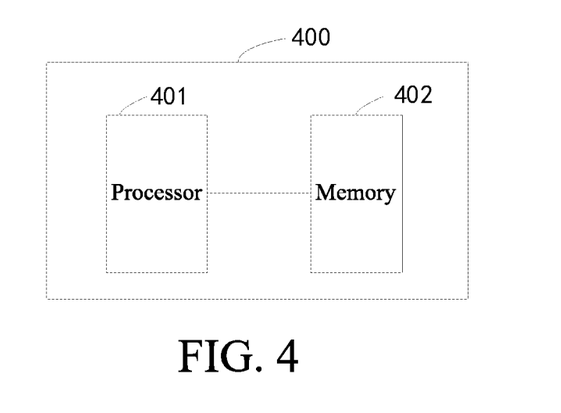
FIG. 4 is a schematic structural diagram of a display terminal provided in an embodiment of the present disclosure.

In addition, an embodiment of the present disclosure also provides a display terminal, which may be a smart phone, a tablet computer, a television, or the like. As shown in FIG. 4, the display terminal 400 includes a processor 401 and a memory 402. The processor 401 is electrically connected to the memory 402.

The processor 401 is a control center of the display terminal 400, which uses various interfaces and wires to connect various parts of the entire display terminal, and runs or loads application programs stored in the memory 402, and calls data stored in the memory 402, to execute various functions of the display terminal and to process data, so as to monitor the display terminal as a whole.

In this embodiment, the processor 401 in the display terminal 400 loads instructions corresponding to the process of one or more application programs into the memory 402 according to the following steps. The processor 401 runs the application programs stored in the memory 402, thereby implement various functions as follow:

a step of acquiring image compression data;

a step of performing inverse quantization on the image compression data based on a preset inverse quantization factor to obtain inversely quantized data; wherein the inverse quantization factor is in integer form; and a step of performing an inverse discrete cosine transformation (DCT) on the inversely quantized data to obtain image data; wherein the inverse DCT includes bit-shift operations and addition operations.

Figure 5:
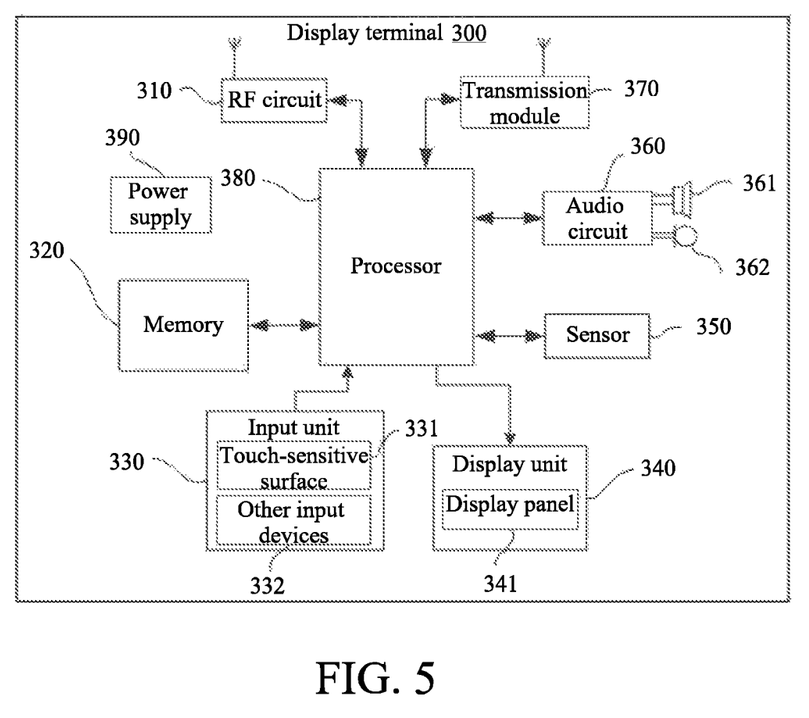
FIG. 5 is another schematic structural diagram of a display terminal provided in an embodiment of the present disclosure.

Please refer to FIG. 5, which is a schematic structural diagram of a display terminal provided in an embodiment of the present disclosure. The display terminal 300 may include an RF circuit 310, a memory 320 including one or more computer-readable storage media, an input unit 330, a display unit 340, a sensor 350, an audio circuit 360, a speaker 361, a microphone 362, a transmission module 370, a processor 380 having one or more processing cores, and a power supply 390. Those skilled in the art can understand that the structure of the display terminal shown in FIG. 5 does not constitute a limitation on the display terminal, and may include more or fewer components than shown in the drawing, or some components may be combined, or different components may be arranged.

The RF circuit 310 is used to receive and send electromagnetic waves, to realize mutual conversion between electromagnetic waves and electrical signals, and to communicate with a communication network or other equipment. The RF circuit 310 may include various existing circuit elements for performing these functions, such as an antenna, a radio frequency transceiver, a digital signal processor, an encryption/decryption chip, a subscriber identity module (SIM) card, a memory, and the like. The RF circuit 310 can communicate with various networks such as the Internet, an intranet, and a wireless network, or communicate with other devices through the wireless network. The wireless network may include a cellular telephone network, a wireless local area network, or a metropolitan area network. The above wireless network can use various communication standards, protocols and technologies, including but not limited to the Global System for Mobile Communication (GSM), Enhanced Data GSM Environment (EDGE), Wideband Code Division Multiple Access (WCDMA), Code Division Multiple Access (CDMA), Time Division Multiple Access (TDMA), Wireless Fidelity (Wi-Fi) (such as the Institute of Electrical and Electronics Engineers' standards IEEE 802.11a, IEEE 802.11b, IEEE802.11g and/or IEEE 802.11n), Voice over Internet Protocol (VoIP), Worldwide Interoperability for Microwave Access (Wi-Max), other protocols for mail, instant messaging, and short messaging, and any other suitable communication protocols, even those protocols that have not yet been developed.

The memory 320 may be used to store software programs and modules, such as the program instructions/modules corresponding to the image decompression device and method in the foregoing embodiment. The processor 380 executes various functional applications by running software programs and modules stored in the memory 320, thereby executing various function applications and data processing, that is, the function of automatic fill light for front camera photography. The memory 320 may include a high-speed random access memory, and may further include a non-volatile memory, such as one or more magnetic storage devices, a flash memory, or other non-volatile solid-state memory. In some examples, the memory 320 may further include a memory which is remotely set with respect to the processor 380, and these remote memories may be connected to the display terminal 300 through a network. Examples of the above network include, but are not limited to, the Internet, an intranet, a local area network, a mobile communication network, and combinations thereof.

The input unit 330 may be used to receive inputted numeric or character information, and generate input signals of a keyboard, a mouse, a joystick, an optical or a trackball, which are related to user settings and function control. Specifically, the input unit 330 may include a touch-sensitive surface 331 and other input devices 332. The touch-sensitive surface 331, also known as a touch display or touchpad, can collect user touch operations on or near it (for example, the user uses a finger, a stylus, or any suitable object or accessory near the touch-sensitive surface 331), and drive the corresponding connection device according to a preset program. Optionally, the touch-sensitive surface 331 may include two parts, which are a touch detection device and a touch controller. The touch detection device detects the user's touch position, and detects the signal brought by the touch operation, and transmits the signal to the touch controller; and the touch controller receives touch information from the touch detection device, converts the touch information into contact coordinates, and then sends the contact coordinates to the processor 380 and is capable of receiving commands from the processor 380 and executing them. In addition, various types such as resistive, capacitive, infrared, and surface acoustic waves can be used to implement the touch-sensitive surface 331. In addition to the touch-sensitive surface 331, the input unit 330 may include other input devices 332. Specifically, the other input devices 332 may include, but are not limited to, one or more of a physical keyboard, function keys (such as volume control keys, switch keys), a trackball, a mouse, a joystick, and the like.

The display unit 340 may be used to display information inputted by a user or information provided to the user and various graphical user interfaces of the display terminal 300. These graphical user interfaces may be composed of graphics, text, icons, videos, and any combination thereof. The display unit 340 may include a display panel 341. Optionally, the display panel 341 may be configured in a form of a liquid crystal display (LCD) or an organic light emitting diode (OLED). Further, the touch-sensitive surface 331 may cover the display panel 341. When the touch-sensitive surface 331 detects that a touch operation on or near the touch-sensitive surface 331, it transmits the touch operation to the processor 380, to determine a type of a touch event. The processor 380 then provides a corresponding visual output on the display panel 341 according to the type of the touch event. Although in FIG. 5, the touch-sensitive surface 331 and the display panel 341 are implemented as two separate components to realize input and output functions, in some embodiments, the touch-sensitive surface 331 and the display panel 341 may be integrated to implement input and output functions.

The display terminal 300 may further include at least one sensor 350, such as a light sensor, a motion sensor, and other sensors. Specifically, the light sensor may include an ambient light sensor and a proximity sensor. The ambient light sensor may adjust the brightness of the display panel 341 according to the brightness of the ambient light. The proximity sensor may turn off the display panel 341 or backlight when the display terminal 300 moves to the ear. As a kind of motion sensors, a gravity acceleration sensor can detect a magnitude of acceleration in various directions (generally three axes). It can detect the magnitude and direction of gravity when it is stationary. It can be used to identify the attitude of mobile phones (such as horizontal and vertical screen switching, games, and magnetometer attitude calibration), and vibration recognition related functions (such as pedometer, tapping). For the display terminal 300, other sensors such as a gyroscope, a barometer, a hygrometer, a thermometer, an infrared sensor, and the like may further be configured, and details are not described herein again.

The audio circuit 360, the speaker 361, and the microphone 362 may provide an audio interface between the user and the display terminal 300. The audio circuit 360 may transmit electrical signals converted from the received audio data to the speaker 361, and the speaker 361 converts the electrical signals into sound signals for outputting. On the other hand, the microphone 362 converts collected sound signals into electrical signals, which are received and converted into audio data by the audio circuit 360, and then the audio data are output to the processor 380 for processing, and then sends it to, for example, another terminal via the RF circuit 310. Alternatively, the audio data are outputted to the memory 320 for further processing. The audio circuit 360 may further include an earphone jack to provide communication between a peripheral headset and the display terminal 300.

The display terminal 300 can help users send and receive emails, browse web pages, and access streaming media through a transmission module 370 (such as a Wi-Fi module). It provides users with wireless broadband Internet access. Although FIG. 5 shows the transmission module 370, it can be understood that the transmission module 370 does not belong to a necessary structure of the display terminal 300, and can be omitted as needed without changing the essence of the invention.

The processor 380 is a control center of the display terminal 300, and connects various parts of the entire mobile phone by using various interfaces and wires, and runs or executes software programs and/or modules stored in the memory 320, calls data stored in the memory 320, executes various functions of the display terminal 300, and processes data, thereby performing overall monitoring of the mobile phone. Optionally, the processor 380 may include one or more processing cores. In some embodiments, the processor 380 may integrate an application processor and a modem processor, wherein the application processor mainly processes an operating system, a user interface, and application programs, and the modem processor mainly processes wireless communications. It can be understood that the foregoing modem processor may also not be integrated into the processor 380.

The display terminal 300 further includes a power source 390 (such as a battery) for supplying power to various components. In some embodiments, the power source may be logically connected to the processor 380 via a power management system, so as to manage functions, such as charging, discharging, and power consumption, via the power management system. The power source 390 may further include arbitrary components, such as one or more direct current or alternative current power sources, a recharging system, a power failure detection circuit, a power converter or inverter, and a power status indicator.

Although not shown, the display terminal 300 may further include a camera (such as a front camera, a rear camera), a Bluetooth module, and the like, and details are not described herein again. Specifically, in this embodiment, the display unit of the display terminal is a touch screen display. The display terminal further includes a memory and one or more programs. One or more programs may be stored in the memory, and be configured to execute one or more programs containing instructions by the above processor for performing operations as follows:

a step of acquiring image compression data;

a step of performing inverse quantization on the image compression data based on a preset inverse quantization factor to obtain inversely quantized data; wherein the inverse quantization factor is in integer form; and a step of performing an inverse discrete cosine transformation (DCT) on the inversely quantized data to obtain image data; wherein the inverse DCT includes bit-shift operations and addition operations.

In a specific implementation, the above modules may be implemented as independent entities, or may be arbitrarily combined, to implement as the same or several entities. For the specific implementation of the above modules, it may be referred to the above method embodiments, which will not be described here again.

Those of ordinary skill in the art may understand that all or part of the steps in the various methods of the foregoing embodiments may be performed by instructions or by controlling related hardware by instructions and the instructions may be stored in a computer-readable storage medium. It can be loaded and executed by the processor. Thus, an embodiment of the present disclosure provides a storage medium, in which a plurality of instructions are stored, and the instructions can be loaded by the processor to execute steps in any one of the image decompression methods provided by the embodiments of the present disclosure.

The storage medium may include: a read-only memory (ROM), a random access memory (RAM), a magnetic disk, or an optical disk.

Since instructions stored in the storage medium can execute the steps in any one of the image decompression methods provided by the embodiments of the present disclosure. Therefore, the beneficial effects that can be achieved by any of the image decompression methods provided by the embodiments of the present disclosure can be realized. Details can be seen in the foregoing embodiments, and are not described herein again.

For specific implementation of the foregoing operations, refer to the foregoing embodiments, and details are not described herein again.

In summary, although the present disclosure has been disclosed above with preferred embodiments, the above preferred embodiments are not intended to limit the present disclosure. Those skilled in the art can make various modifications and refinements without departing from the spirit and scope of the present disclosure. Therefore, a scope of protection of the present disclosure is subject to a scope defined by the claims.

What is claimed is:

1. An image decompression method, comprising:
a step of acquiring a DCT basis and a quantization factor which are both used during image compression;
a step of acquiring a decimal part of the DCT basis;
a step of performing a left-shift operation on the decimal part by a preset number of bits, to obtain an integer;
a step of rounding a value obtained by multiplying the obtained integer and the quantization factor, to obtain an inverse quantization factor;
a step of acquiring image compression data;
a step of performing inverse quantization on the image compression data based on the inverse quantization factor to obtain inversely quantized data; wherein the inverse quantization factor is in integer form; and
a step of performing an inverse discrete cosine transformation (DCT) on the inversely quantized data to obtain image data; wherein the inverse DCT includes bit-shift operations and addition operations.

2. The image decompression method as claimed in claim 1, wherein the inversely quantized data are in a form of a matrix of n rows by n columns, wherein n is greater than 1; and
the step of performing the inverse DCT on the inversely quantized data to obtain the image data comprises:
a step of performing a transformation operation on data in each row of the inversely quantized data to obtain a row-transformation matrix; wherein the transformation operation includes bit-shift operations and addition operations;

a step of performing the transformation operation on data in each column of the row-transformation matrix to obtain a column-transformation matrix; and
a step of performing a right-shift operation on the column-transformation matrix by the preset number of bits, to obtain image data.

3. The image decompression method as claimed in claim 2, wherein the step of performing the transformation operation on data in each row of the inversely quantized data to obtain the row-transformation matrix comprises:
a step of serving data in each row of the inversely quantized data as a target matrix, forming odd-position data of the target matrix as an odd-position matrix, and forming even-position data of the target matrix as an even-position matrix;
a step of performing a first operation on the odd-position matrix to obtain a first operation matrix; wherein the first operation includes bit-shift operations and addition operations;
a step of performing a second operation on the even-position matrix to obtain a second operation matrix; wherein the second operation includes bit-shift operations and addition operations;
a step of calculating a sum of the first operation matrix and the second operation matrix to obtain a first transformation matrix;
a step of calculating a difference between the first operation matrix and the second operation matrix to obtain a second transformation matrix; and
a step of merging data of the first transformation matrix with data of the second transformation matrix into a target transformation matrix corresponding to the target matrix; wherein the target transformation matrix corresponding to the data in the n rows of the inversely quantized data constitutes the row-transformation matrix.

4. The image decompression method as claimed in claim 3, wherein the inversely quantized data are in a form of a matrix of 8 rows by 8 columns, and the target matrix is a matrix of 1 row by 8 columns;
wherein the first operation is operated as follows:

$$Y\_1C = \begin{bmatrix} 1 & 2 & 1 & 1 \\ 1 & 1 & -1 & -2 \\ 1 & -1 & -1 & 2 \\ 1 & -2 & 1 & 1 \end{bmatrix} * \begin{bmatrix} da1 \\ da3 \\ da5 \\ da7 \end{bmatrix};$$

wherein Y_1C is the first operation matrix, $$\begin{bmatrix} da1 \\ da3 \\ da5 \\ da7 \end{bmatrix}$$

is the odd-position matrix, and da1, da3, da5, and da7 are the odd-position data of the target matrix; and
wherein the second operation is operated as follows:

$$Y\_2C = \begin{bmatrix} 1 & 1 & 1 & 0 \\ 1 & 0 & -1 & -1 \\ 1 & -1 & 0 & 1 \\ 0 & -1 & 1 & -1 \end{bmatrix} * \begin{bmatrix} 4 & 0 & 0 & 1 \\ 0 & 4 & -1 & 0 \\ 0 & 1 & 4 & 0 \\ -1 & 0 & 0 & 4 \end{bmatrix} * \begin{bmatrix} da2 \\ da4 \\ da6 \\ da8 \end{bmatrix} +$$

-continued $$\begin{bmatrix} 1 & 1 & 1 & 0 \\ 1 & 0 & -1 & -1 \\ 1 & -1 & 0 & 1 \\ 0 & -1 & 1 & -1 \end{bmatrix} * \begin{bmatrix} 1 & 0 & 0 & 0 \\ 0 & 1 & 0 & 0 \\ 0 & 0 & 1 & 0 \\ 0 & 0 & 0 & 1 \end{bmatrix} * \begin{bmatrix} da2 \\ da4 \\ da6 \\ da8 \end{bmatrix};$$

wherein Y_2C is the second operation matrix, $$\begin{bmatrix} da2 \\ da4 \\ da6 \\ da8 \end{bmatrix}$$

is the even-position matrix, and da2, da4, da6, and da8 are even-position data of the target matrix.

5. An image decompression device, comprising:
a factor acquiring module configured to acquire a DCT basis and a quantization factor which are both used during image compression;
a decimal acquiring module configured to acquire a decimal part of the DCT basis;
a left-shift module configured to perform a left-shift operation on the decimal part by a preset number of bits, to obtain an integer;
a rounding module configured to round a value obtained by multiplying the obtained integer and the quantization factor, to obtain an inverse quantization factor;
a data acquiring module configured to acquire image compression data;
an inverse quantization module configured to perform inverse quantization on the image compression data based on the inverse quantization factor to obtain inversely quantized data; wherein the inverse quantization factor is in integer form; and
an inverse transformation module configured to perform an inverse discrete cosine transformation (DCT) on the inversely quantized data to obtain image data; wherein the inverse DCT includes bit-shift operations and addition operations.

6. The image decompression device as claimed in claim 5, wherein the inversely quantized data are in a form of a matrix of n rows by n columns, wherein n is greater than 1; and
wherein the inverse transformation module comprises:
a row-transformation unit configured to perform a transformation operation on data in each row of the inversely quantized data to obtain a row-transformation matrix; wherein the transformation operation includes bit-shift operations and addition operations;
a column-transformation unit configured to perform the transformation operation on data in each column of the row-transformation matrix to obtain a column-transformation matrix; and
a right-shift unit configured to perform a right-shift operation by the preset number of bits on the column-transformation matrix, to obtain image data.

7. The image decompression device as claimed in claim 6, wherein the row-transformation unit comprises:
a matrix acquiring sub-unit configured to serve each row of the inversely quantized data as a target matrix, forming odd-position data of the target matrix as an odd-position matrix, and forming even-position data of the target matrix as an even-position matrix;
a first operation sub-unit configured to perform a first operation on the odd-position matrix to obtain a first operation matrix; wherein the first operation includes bit-shift operations and addition operations;
a second operation sub-unit configured to perform a second operation on the even-position matrix to obtain a second operation matrix; wherein the second operation includes bit-shift operations and addition operations;
a first calculation sub-unit configured to calculate a sum of the first operation matrix and the second operation matrix to obtain a first transformation matrix;
a second calculation sub-unit configured to calculate a difference between the first operation matrix and the second operation matrix to obtain a second transformation matrix; and
a merging sub-unit configured to merge data of the first transformation matrix with data of the second transformation matrix into a target transformation matrix corresponding to the target matrix; wherein the target transformation matrix corresponding to the data in the n rows of the inversely quantized data constitutes the row-transformation matrix.

8. The image decompression device as claimed in claim 7, wherein the inversely quantized data are in a form of a matrix of 8 rows by 8 columns, and the target matrix is a matrix of 1 row by 8 columns; and
wherein the first operation is operated as follows:

$$Y\_1C = \begin{bmatrix} 1 & 2 & 1 & 1 \\ 1 & 1 & -1 & -2 \\ 1 & -1 & -1 & 2 \\ 1 & -2 & 1 & 1 \end{bmatrix} * \begin{bmatrix} da1 \\ da3 \\ da5 \\ da7 \end{bmatrix};$$

wherein Y_1C is the first operation matrix, $$\begin{bmatrix} da1 \\ da3 \\ da5 \\ da7 \end{bmatrix}$$

is the odd-position matrix, and da1, da3, da5, and da7 are the odd-position data of the target matrix; and
wherein the second operation is operated as follows:

$$Y\_2C = \begin{bmatrix} 1 & 1 & 1 & 0 \\ 1 & 0 & -1 & -1 \\ 1 & -1 & 0 & 1 \\ 0 & -1 & 1 & -1 \end{bmatrix} * \begin{bmatrix} 4 & 0 & 0 & 1 \\ 0 & 4 & -1 & 0 \\ 0 & 1 & 4 & 0 \\ -1 & 0 & 0 & 4 \end{bmatrix} * \begin{bmatrix} da2 \\ da4 \\ da6 \\ da8 \end{bmatrix} +$$

$$\begin{bmatrix} 1 & 1 & 1 & 0 \\ 1 & 0 & -1 & -1 \\ 1 & -1 & 0 & 1 \\ 0 & -1 & 1 & -1 \end{bmatrix} * \begin{bmatrix} 1 & 0 & 0 & 0 \\ 0 & 1 & 0 & 0 \\ 0 & 0 & 1 & 0 \\ 0 & 0 & 0 & 1 \end{bmatrix} * \begin{bmatrix} da2 \\ da4 \\ da6 \\ da8 \end{bmatrix};$$

wherein Y_2C is the second operation matrix, $$\begin{bmatrix} da2 \\ da4 \\ da6 \\ da8 \end{bmatrix}$$

is the even-position matrix, and da2, da4, da6, and da8 are even-position data of the target matrix.

9. A display terminal, which comprises a processor and a memory configured to store a plurality of instructions and data, wherein the processor is configured to execute steps comprising:
 a step of acquiring a DCT basis and a quantization factor which are both used during image compression;
 a step of acquiring a decimal part of the DCT basis;
 a step of performing a left-shift operation on the decimal part by a preset number of bits, to obtain an integer;
 a step of rounding a value obtained by multiplying the obtained integer and the quantization factor, to obtain an inverse quantization factor;
 a step of acquiring image compression data;
 a step of performing inverse quantization on the image compression data based on the inverse quantization factor to obtain inversely quantized data; wherein the inverse quantization factor is in integer form; and
 a step of performing an inverse discrete cosine transformation (DCT) on the inversely quantized data to obtain image data; wherein the inverse DCT includes bit-shift operations and addition operations.

10. The display terminal as claimed in claim 9, wherein the inversely quantized data are in a form of a matrix of n rows by n columns, wherein n is greater than 1; and
 the step of performing the inverse DCT on the inversely quantized data to obtain the image data comprises:
 a step of performing a transformation operation on data in each row of the inversely quantized data to obtain a row-transformation matrix; wherein the transformation operation includes bit-shift operations and addition operations;
 a step of performing the transformation operation on data in each column of the row-transformation matrix to obtain a column-transformation matrix; and
 a step of performing a right-shift operation on the column-transformation matrix by the preset number of bits, to obtain image data.

11. The display terminal as claimed in claim 10, wherein the step of performing the transformation operation on data in each row of the inversely quantized data to obtain the row-transformation matrix comprises:
 a step of serving data in each row of the inversely quantized data as a target matrix, forming odd-position data of the target matrix as an odd-position matrix, and forming even-position data of the target matrix as an even-position matrix;
 a step of performing a first operation on the odd-position matrix to obtain a first operation matrix; wherein the first operation includes bit-shift operations and addition operations;
 a step of performing a second operation on the even-position matrix to obtain a second operation matrix; wherein the second operation includes bit-shift operations and addition operations;
 a step of calculating a sum of the first operation matrix and the second operation matrix to obtain a first transformation matrix;
 a step of calculating a difference between the first operation matrix and the second operation matrix to obtain a second transformation matrix; and
 a step of merging data of the first transformation matrix with data of the second transformation matrix into a target transformation matrix corresponding to the target matrix; wherein the target transformation matrix corresponding to the data in the n rows of the inversely quantized data constitutes the row-transformation matrix.

12. The display terminal as claimed in claim 11, wherein the inversely quantized data are in a form of a matrix of 8 rows by 8 columns, and the target matrix is a matrix of 1 row by 8 columns;
 wherein the first operation is operated as follows:

$$Y\_1C = \begin{bmatrix} 1 & 2 & 1 & 1 \\ 1 & 1 & -1 & -2 \\ 1 & -1 & -1 & 2 \\ 1 & -2 & 1 & 1 \end{bmatrix} * \begin{bmatrix} da1 \\ da3 \\ da5 \\ da7 \end{bmatrix};$$

wherein Y_1C is the first operation matrix, $$\begin{bmatrix} da1 \\ da3 \\ da5 \\ da7 \end{bmatrix}$$

is the odd-position matrix, and da1, da3, da5, and da7 are the odd-position data of the target matrix; and
wherein the second operation is operated as follows:

$$Y\_2C = \begin{bmatrix} 1 & 1 & 1 & 0 \\ 1 & 0 & -1 & -1 \\ 1 & -1 & 0 & 1 \\ 0 & -1 & 1 & -1 \end{bmatrix} * \begin{bmatrix} 4 & 0 & 0 & 1 \\ 0 & 4 & -1 & 0 \\ 0 & 1 & 4 & 0 \\ -1 & 0 & 0 & 4 \end{bmatrix} * \begin{bmatrix} da2 \\ da4 \\ da6 \\ da8 \end{bmatrix} +$$

$$\begin{bmatrix} 1 & 1 & 1 & 0 \\ 1 & 0 & -1 & -1 \\ 1 & -1 & 0 & 1 \\ 0 & -1 & 1 & -1 \end{bmatrix} * \begin{bmatrix} 1 & 0 & 0 & 0 \\ 0 & 1 & 0 & 0 \\ 0 & 0 & 1 & 0 \\ 0 & 0 & 0 & 1 \end{bmatrix} * \begin{bmatrix} da2 \\ da4 \\ da6 \\ da8 \end{bmatrix};$$

wherein Y_2C is the second operation matrix, $$\begin{bmatrix} da2 \\ da4 \\ da6 \\ da8 \end{bmatrix}$$

is the even-position matrix, and da2, da4, da6, and da8 are even-position data of the target matrix.

\* \* \* \* \*